3,259,596
PAPER COATING COMPOSITION COMPRISING PIGMENT, STARCH, BUTADIENE COPOLYMER AND STYRENE-MALEIC ANHYDRIDE COPOLYMER
John Michael Downer, Harpenden, Donald Graham Hobbs, Welwyn Garden City, and David Brian Wootton, Wheathampstead, England, assignors to Imperial Chemical Industries Limited, London, England, a corporation of Great Britain
No Drawing. Filed June 11, 1962, Ser. No. 201,737
Claims priority, application Great Britain, June 29, 1961, 23,558/61
8 Claims. (Cl. 260—17.4)

The present invention relates to an improved pigmented composition for coating paper and like substrates.

The use of copolymer latices as binders for pigments in coating paper has grown considerably over the past few years. In particular copolymers of butadiene and styrene or methyl methacrylate and containing from 30 to 50% by weight of butadiene-1,3 residues have been found to be very suitable for this purpose. Such copolymers are not normally used as the sole pigment binders but are generally blended in latex form with such conventional binders as casein, starch or soya protein. Difficulty arises when starch is used because, unless special precautions are taken, the starch seriously reduces the stability of the copolymer latex. This difficulty can be overcome and the latex and starch rendered compatible by prestabilising the copolymer latex by adding casein to it. However this is a step that users of such latices prefer to avoid and it is therefore an object of this invention to provide a method of making a stable composition for coating paper or like material using as the pigment binder a styrene/butadiene or methyl methacrylate/butadiene type copolymer and starch.

According to the present invention we provide a method of making a paper coating composition which comprises forming an intimate mixture of mineral pigment, starch and a copolymer containing from 30 to 50% by weight of butadiene-1,3 residues and at least half of the remainder styrene and/or methyl methacrylate residues, any other constituent of the copolymer being derived from another monoethylenically unsaturated compound, said copolymer before being brought into contact with the starch being in the form of a stable dispersion containing as a stabilising agent from 0.5 to 10% by weight based on the weight of said butadiene-1,3 copolymer of a copolymer of styrene and any of maleic anhydride, the alkyl esters of maleic acid containing up to eight carbon atoms in the alkyl group and the half amides of maleic acid said copolymer being in the form of an alkaline solution, there being in the composition from 8 to 50 parts by weight of starch and butadiene-1,3 copolymer together per 100 parts by weight of pigment and from 0.5 to 2 parts by weight of butadiene-1,3 copolymer to each one part by weight of starch.

The buatadiene-1,3 copolymers can be binary copolymers made from butadiene-1,3 and styrene or butadiene-1,3 and methyl methacrylate as the essential comonomers, and such copolymers have extremely good pigment binding properties. However, other monoethylenically unsaturated monomers can be copolymerised with the butadiene-1,3 and styrene and/or methyl methacrylate to form pigment binders e.g. acrylonitrile, methacrylonitrile, methacrylic acid and ethyl acrylate. There is little advantage to be gained by using more complicated copolymers and we prefer therefore to use as binders copolymers containing from 55 to 65% by weight of styrene and/or methyl methacrylate residues and the remainder butadiene-1,3 residues because these have the required pigment binding properties. It may however be an advantage in some ways for the copolymer to have a small proportion e.g. from 0.05% to 13.5% by weight of carboxyl groups expressed as —COOH. These may be introduced by including a monomer containing one or more carboxyl groups e.g. acrylic or itaconic acid as one of the monomer components of the mixture for making the butadiene-1,3 copolymer. These copolymers can be prepared by well known polymerisation processes and are most conveniently prepared by the emulsion polymerisation process in which the monomers to be polymerised are dispersed in an aqueous phase containing an emulsifying agent and there polymerised in the presence of a catalyst to form a stable copolymer dispersion.

The copolymers of styrene and maleic anhydride or half esters or amides can also be prepared by well known methods. It is preferred to use copolymers derived from 0.5 to 2 molecular proportions of maleic anhydride or related compound to each molecular proportion of styrene because such copolymers have good solubility in alkalies to form solutions that confer excellent starch compatibility upon the butadiene-1,3 copolymer dispersion.

The copolymers of styrene and maleic anhydride and its related compounds may be formed by mass or solvent polymerisation, in which case the copolymer is obtained as a solid. The solid copolymer can be dissolved in alkali and the solution added to the butadiene-1,3 copolymer dispersion to give the latter starch compatibility. No useful compatibilising effect is obtained when less than 0.5% by weight is used based on the weight of the butadiene-1,3 copolymer, and in general the most useful results are obtained when from 2 to 5% by weight are used. These copolymers are used in the form of solutions in alkali e.g. in ammonia, sodium or potassium hydroxide, triethanolamine, or morpholine. The solutions can be quite easily prepared by first forming a slurry of the copolymer with water and then adding sufficient alkali to dissolve the copolymer.

The ingredients to form the coating composition may be added together in any order. The pigment is normally used in the form of an aqueous dispersion containing from 30 to 70% by weight of pigment. Mineral pigments commonly used in paper coating compositions include china clay, titanium dioxide, satin white, blanc fixe and calcium carbonate.

The starch may be used in any of its normally available forms.

Our invention is illustrated but in no way limited by the following examples in which all parts are expressed by weight.

*Example 1*

The copolymer binder used was a copolymer of butadiene-1,3 and styrene containing 38% by weight of butadiene residues and 62% by weight of styrene residues in the form of a stable aqueous dispersion containing 50% by weight of copolymer.

To this latex was added an alkaline solution of a copolymer of styrene and maleic anhydride containing 50 mole percent of styrene and 50 mole percent of maleic anhydride. This solution was prepared by first forming a slurry of the copolymer in water containing a wetting agent and then adding sufficient morpholine to dissolve the copolymer. A solution containing 12% w./w. styrene/maleic anhydride copolymer was obtained and this was added to the latex in the proportion 25 parts solution to 200 parts latex.

A composition for coating paper was prepared as follows:

| | Parts dry weight |
|---|---|
| China clay | 100 |
| Starch | 15 |
| Stabilised latex | 15 |

The china clay was dispersed in water to give a dispersion containing 60% by weight of solids, and to this was added with continuous agitation the starch in the form of a hot solution containing 20% by weight of starch and prepared by dispersing the starch in water and heating to 95° C.

The required amount of stabilized latex was added to the mixture followed by sufficient water to adjust the total solids content to 42% by weight.

This composition was then used to coat a bleached sulphite wood free base paper of Cobb size 40 by means of the air knife coating process to give a coat weight of 25 gms./sq. metre on each side. The coated paper was supercalendered. It had high gloss, pick strength and water resistance and was suitable for printing by the offset litho process.

*Example 2*

The procedure of Example 1 was followed but instead of a butadiene/styrene coploymer latex, a latex containing 50% by weight of a copolymer of methyl methacrylate and butadiene-1,3 and containing 62% by weight of methyl methacrylate residues and 38% butadiene-1,3 residues was used.

We claim:

1. A method of making a paper coating composition which comprises forming an intimate mixture of mineral pigment, starch and a copolymer containing from 30 to 50% by weight of butadiene-1,3 residues and at least half of the remainder being at least one member selected from the group consisting of styrene and methyl methacrylate residues, any other constituent of the copolymer being derived from another monoethylenically unsaturated compound, said copolymer being brought into contact with the starch in the form of a stable dispersion containing as a stabilizing agent from 2 to 5% by weight based on the weight of said butadiene-1,3 copolymer of an alkaline solution of a copolymer of styrene and maleic anhydride, there being in the composition from 8 to 50 parts by weight of starch and butadiene-1,3 copolymer together per 100 parts by weight of pigment and from 0.5 to 2 parts by weight of butadiene-1,3 copolymer to each part by weight of starch.

2. A method according to claim 1 in which the butadiene copolymer is derived essentially from butadiene-1,3 and at least one member of the group consisting of styrene and methyl methacrylate.

3. A method according to claim 2 in which the butadiene copolymer contains from 55 to 65% by weight of said member of the group consisting of styrene and methyl methacrylate residues.

4. A method according to claim 1 in which the butadiene-1,3 copolymer contains from 0.05% to 13.5% by weight of carboxyl groups expressed as —COOH.

5. A method according to claim 1 in which the copolymer of styrene and maleic anhydride is derived from mixtures of 0.5 to 2 molecular proportions of maleic anhydride to each molecular proportion of styrene.

6. A method according to claim 1 in which the alkali used to make the alkaline solution is selected from the group consisting of ammonia, sodium hydroxide, potassium hydroxide, triethanolamine, and morpholine.

7. A paper coating composition according to claim 1.

8. Paper coated with the dried composition according to claim 7.

References Cited by the Examiner

UNITED STATES PATENTS

| 2,537,114 | 1/1951 | Young et al. | 260—17.4 |
| 2,576,914 | 12/1951 | Barrett | 117—155 |
| 2,651,580 | 9/1953 | Reilly | 260—17.4 |
| 2,798,062 | 7/1957 | Contois | 260—29.7 |
| 2,840,492 | 6/1958 | Emerson | 260—29.7 |
| 3,047,427 | 7/1962 | Dratz | 117—155 |

JOSEPH L. SCHOFER, *Primary Examiner.*

JAMES A. SEIDLECK, *Examiner.*